United States Patent [19]

Olney et al.

[11] Patent Number: 5,325,901
[45] Date of Patent: Jul. 5, 1994

[54] VEHICLE WHEEL INCORPORATING TIRE AIR PRESSURE SENSOR

[75] Inventors: Ross D. Olney, West Hills; John W. Reeds, Thousand Oaks, both of Calif.

[73] Assignee: Hughes Aircraft Company, Los Angeles, Calif.

[21] Appl. No.: 957,291

[22] Filed: Oct. 6, 1992

[51] Int. Cl.[5] .............................................. B60C 23/00
[52] U.S. Cl. .................................. 152/418; 340/443; 200/61.22; 200/61.25
[58] Field of Search .............. 152/415, 418; 340/442, 340/443; 73/146.5; 200/61.22, 61.25

[56] References Cited

U.S. PATENT DOCUMENTS

| | | | |
|---|---|---|---|
| 3,873,787 | 3/1975 | Nozi | 200/61.25 |
| 4,067,376 | 1/1978 | Barabino | 152/418 |
| 4,619,137 | 10/1986 | Bott | 340/442 X |
| 4,742,857 | 5/1988 | Gandhi | 152/418 |
| 4,894,639 | 1/1990 | Schmierer | 200/61.22 X |
| 4,938,272 | 7/1990 | Sandy, Jr. et al. | 152/427 |
| 5,063,774 | 11/1991 | Burkard et al. | 200/61.25 X |
| 5,065,134 | 11/1991 | Schmid et al. | 340/442 |
| 5,134,880 | 8/1992 | Gerhard | 340/442 X |

OTHER PUBLICATIONS

EPIC Technologies, Inc. brochure, "Technical Description EPIC Low Tire Warning System", published at least as early as Jul. 1990.

Primary Examiner—Michael W. Ball
Assistant Examiner—Francis J. Lorin
Attorney, Agent, or Firm—V. D. Duraiswamy; W. K. Denson-Low

[57] ABSTRACT

A tire air pressure sensor is mounted on a vehicle wheel and includes an inertial mass which is urged radially outwardly by centrifugal force resulting from rotation of the wheel. The tire air pressure is applied to the inertial mass in opposition to the centrifugal force. When the rotational speed of the wheel is sufficient that the centrifugal force overcomes the applied air pressure, the inertial mass moves radially outwardly and opens a switch. The speed at which the switch opens is a predetermined function of the tire pressure. In another embodiment, a second sensor is provided to sense when the tire pressure is below a minimum value. A spring urges an inertial mass inwardly in opposition to the centrifugal force, and the tire pressure is applied to a bellows having an end which moves radially outwardly in proportion to the applied pressure. The bellows opens a first switch when the pressure is higher than the minimum value, and the inertial mass moves radially outwardly away from the end of the bellows to open a second switch when the wheel speed exceeds the value corresponding to the tire pressure.

31 Claims, 5 Drawing Sheets

VEHICLE WHEEL INCORPORATING TIRE AIR PRESSURE SENSOR

BACKGROUND OF THE INVENTION

1. Field of the Invention

The present invention generally relates to the art of automotive vehicles, and more specifically to a wheel for a vehicle incorporating a sensor for continuously monitoring the air pressure in a tire mounted on the wheel during operation of the vehicle.

2. Description of the Related Art

Low tire pressure is a primary cause of excessive fuel consumption, tire wear and impaired steerability. A normal tire will typically leak on the order of 25 percent of its pressure per year due to its inherent permeability. It is thus good practice to maintain tire pressure on a regular basis.

However, even checking tire pressure every few weeks may not prevent these adverse affects when a slow leak is present, and the leak may go undetected unless a careful record is maintained of how frequently the pressure in each tire has to be replenished. A fast leak or flat condition can rapidly cause damage to the tire and even render it unusable in a short period of time, but this condition may go unnoticed by an inexperienced driver until it is too late.

It is thus highly desirable to have some mechanism that automatically indicates to the driver when the tire pressure is too low. One such system is disclosed in U.S. Pat. No. 4,067,376 to Barabino. This patent discloses a high pressure air reservoir provided in the vehicle wheel, and a valve that automatically opens a passageway between the high pressure reservoir and the tire in response to the tire pressure falling below a selected threshold level. In this manner, the tire pressure is automatically prevented from dropping below this level.

Although Barabino's system accomplishes its intended purpose, the valve includes a complicated and expensive porting arrangement which limits its practical commercial application.

SUMMARY OF THE INVENTION

The present invention provides a vehicle wheel for mounting a tire thereon which incorporates a simple and inexpensive, yet accurate and reliable sensor for monitoring the air pressure in the tire.

More specifically, a tire air pressure sensor is mounted on a vehicle wheel and includes an inertial mass which is urged radially outwardly by centrifugal force resulting from rotation of the wheel.

In a first embodiment of the invention, the tire air pressure is applied to the inertial mass in opposition to the centrifugal force. When the rotational speed of the wheel is sufficient that the centrifugal force overcomes the applied air pressure, the inertial mass moves radially outwardly and opens a switch. The speed at which the switch opens is a predetermined function of the tire pressure.

In a second embodiment of the invention, another sensor is provided to sense when the tire pressure is below a minimum value. A spring urges the inertial mass inwardly in opposition to the Centrifugal force, and the tire pressure is applied to a bellows having an end which moves radially outwardly in proportion to the applied pressure.

The bellows opens a first switch when the pressure is higher than the minimum value, and the inertial mass moves radially outwardly away from the end of the bellows to open a second switch when the wheel speed exceeds the value corresponding to the tire pressure.

The present sensor may be used exclusively for indicating the tire pressure to the vehicle driver, or may be used to control a system such as disclosed by Barabino in which air is automatically fed from a high pressure reservoir into a tire when the sensed pressure drops below a certain value.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
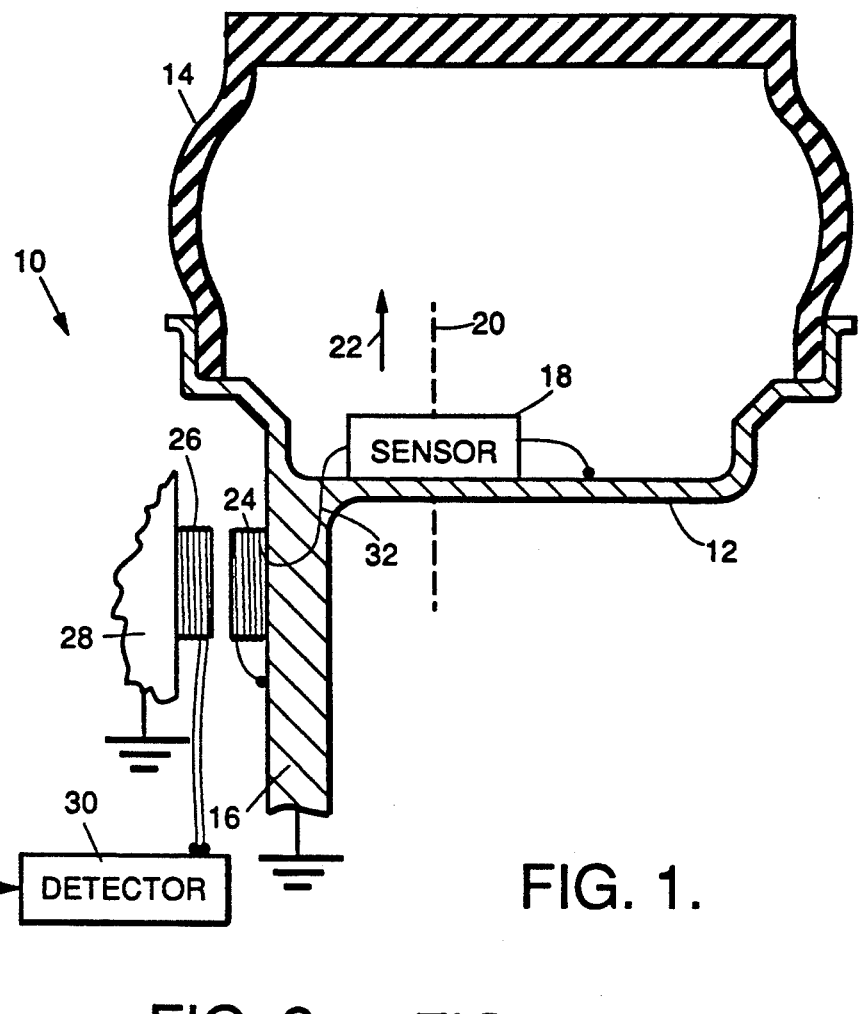
FIG. 1 is a fragmentary cross sectional view illustrating a vehicle wheel and tire incorporating a tire air pressure sensor embodying the present invention.

As illustrated in FIG. 1, a wheel 10 for an automotive or other type of vehicle includes a rim 12 on which a tire 14 is mounted. The wheel 10 further includes a circular body or wall 16 which extends radially inwardly from the rim 12 and is formed with holes (not shown) for mounting the wheel 10 on an axle of the vehicle.

A tire air pressure sensor 18 embodying the invention is preferably fixed to the rim 12 inside the inflation space of tire 14. In this manner, the sensor 18 is exposed directly to the air pressure in the tire 14. However, it is within the scope of the invention, although not explicitly illustrated, to mount the sensor 18 on the wall 16 or at another location and provide a conduit for transmitting the tire air pressure to the sensor 18.

The sensor 18 is mounted with its sensitive axis coincident with a radial axis 20 which perpendicularly intersects the rotational axis of the wheel 10. The radially outward direction along the axis 20 is indicated by an arrow 22. An electrical secondary winding or coil 24 is fixed to the wall 16 of the wheel 10 for integral rotation therewith. An electrical primary winding or coil 26 is fixed to a structural member 28 of the vehicle which does not rotate with the wheel 10. The coil 24 is proximate to the coil 26 and inductively coupled thereto at the illustrated rotational position of the wheel 10.

The structural member 28 and wheel 10 are electrically grounded. Both ends of the coil 26 are connected to a detector unit 30. One end of the coil 24 is grounded, and the other end is connected to the sensor 18 through a lead 32.

Figure 2:
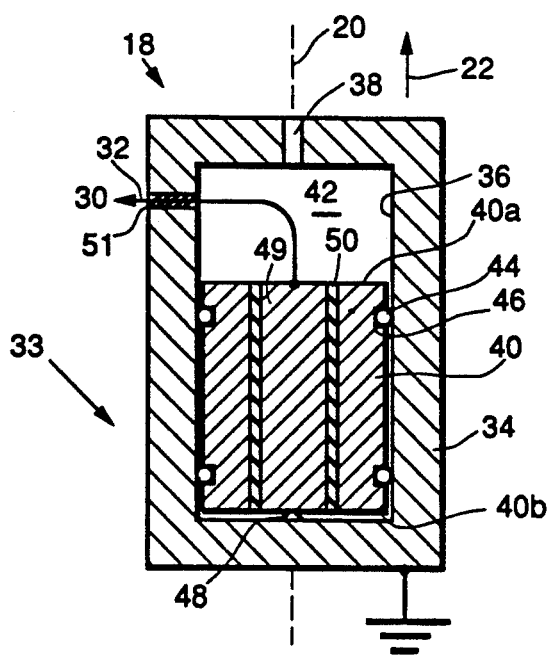
FIG. 2 is a sectional view illustrating an embodiment of the sensor in which the tire air pressure is applied to a piston, and the wheel is stationary or rotating at a relatively low speed.
Figure 3:
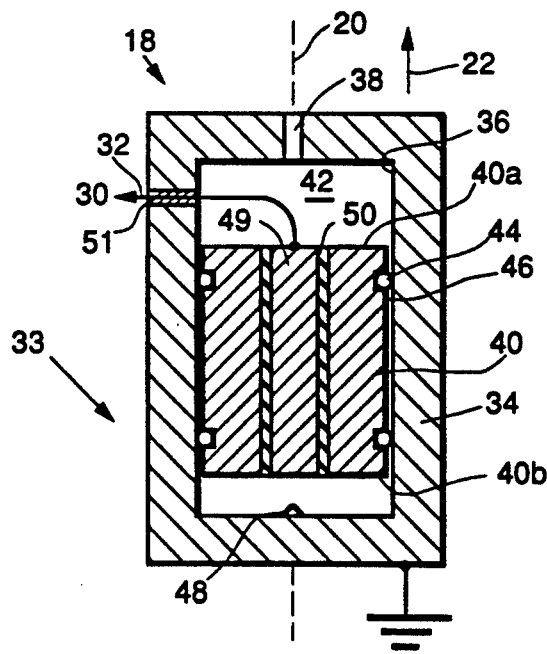
FIG. 3 is similar to FIG. 2, but illustrates the sensor with the wheel rotating at a relatively high speed.

As illustrated in FIGS. 2 and 3, the sensor 18 includes a switch 33 which is connected between the lead 32 and ground. The switch 33 is in a first state (closed) at relatively low vehicle (tire rotational) speeds, and in a second state (open) at higher speeds. The detector unit 30 includes circuitry for detecting whether the switch 33 in the sensor 18 is open or closed. The impedance of the coil 24 is reflected back to the coil 26, and appears as a small load when the switch 33 is open, and as a high load when the switch 33 is closed.

The detector unit 30 may include an oscillator (not shown) for applying constant current pulses to the coil 26 and circuitry for sensing the voltage across the coil 26. The voltage will be lower when the switch 33 is closed than when the switch 33 is open. Alternatively, the detector unit 30 may apply constant voltage pulses to the coil 26 and sense the current through the coil 26. The current will be higher when the switch 33 is closed than when the switch 33 is open.

Alternatively, a capacitor (not shown) may be connected in parallel with the coil 24 to form a parallel resonant circuit which oscillates in response to induced pulses from the coil 26 when the switch 33 is open and does not oscillate when the switch 33 is closed. The oscillation in the coil 24 is reflected back to the coil 26 as a "ringing" signal which can be detected by the detector unit 30.

The sensor 18 is illustrated in FIGS. 2 and 3, and includes an electrically conductive housing or body 34 which is connected to ground. A bore 36 is formed in the body 34 and extends along the axis 20. The radially inner end of the bore 36 is closed, whereas the radially outer end of the bore 36 communicates with the inflation space of the tire 14 through a passageway 38.

An electrically conductive piston 40 which constitutes an inertial mass is sealingly slidable in the bore 36 along the axis 20. A pressure chamber 42 is defined in the bore 36 above a radially outer face 40a of the piston 40. The pressure chamber 42 communicates with the inflation space of the tire 14 through the passageway 38, such that the pressure in the chamber 42 is the same as the pressure in the tire 14.

Further illustrated are rubber or plastic 0-rings 44 which fit in circumferential grooves 46 in the piston 40 to enhance the seal between the piston 40 and the wall of the bore 36. An electrically conductive projection 48 extends from the radially inner end wall of the bore 36 toward a radially inner face 40b of the piston 40. A conductive rod 49 extends through a bore formed through the central axis of the piston 40 and is insulated from the radially outer main body of the piston 40 by a sleeve 50 made of plastic or other electrically insulative material. The rod 49 and sleeve 50 are tightly fitted in the piston 40 and move integrally therewith.

The rod 49 is electrically connected to the lead 32 which extends through an insulator 51 for insulating the lead 32 from the body 34. The projection 48 constitutes a first contact of the switch 33, whereas the rod 49 constitutes a second contact thereof. In the position of FIG. 2, the rod 49 contacts the projection 48 and the switch 33 is closed. In the position of FIG. 3, the rod 49 is spaced from the projection 48 and the switch 33 is open.

If the O-rings 44 effectively insulate the piston 40 from the body 34, it is possible to omit the rod 49 and sleeve 50 and connect the lead 32 directly to the piston 40. However, the illustrated arrangement is preferred since it enables the piston 40 to contact the body 34 without erroneously closing the switch 33. Such contact might result from wear after prolonged operation of the sensor 18.

The air pressure in the pressure chamber 42 acts on the radially outer face 40a of the piston 40 and urges the piston 40 radially inwardly opposite to the arrow 22. When the vehicle is stationary or moving at a relatively low speed, the rod 49 is held against the projection 48 by the air pressure, and the switch 33 is closed. The radially inward force Fin exerted on the piston 40 by the air pressure in the chamber 42 is Fin=PA, where P is the air pressure in the chamber 42 (the tire air pressure) and A is the area of the face 40a of the piston 40.

Movement of the vehicle and rotation of the wheel 10 creates a centrifugal force Fout which urges the piston 40 radially outwardly in the direction of the arrow 22. The force Fout=4 mrV$^2$/D$^2$, where m is the mass of the piston 40, r is the radial distance from the center of rotation of the wheel 10 to the radially outer tip of the projection 48, V is the linear speed of the vehicle and D is the diameter of the tire 14.

When the centrifugal force Fout exerted on the piston 40 resulting from rotation of the wheel 10 exceeds the force Fin exerted on the piston 40 by the pressure in the chamber 42, the piston 40 and rod 49 move away from the projection 48 and the switch 33 opens. The switch 33 opens at Fout=Fin, or PA=4 mrV$^2$/D$^2$, such that P=(4 mr/AD$^2$)V$^2$. Since m, r, A and D are constant, the tire air pressure P varies as a predetermined function of vehicle speed V. More specifically, the tire air pressure P is proportional to the square of the vehicle speed V.

The vehicle on which the wheel 10 is mounted conventionally includes a speedometer or tachometer for sensing the vehicle speed V. The speed V at which the switch 33 opens is related to the tire pressure P in a precisely predetermined manner, P=KV$^2$, where K=4 mr/AD$^2$. The detector unit 30 comprises a computing circuit, which may be embodied by a conventional microprocessor or a dedicated hardware unit, for computing the tire pressure P by squaring the speed V and multiplying by the constant K. The computed tire pressure P may be displayed on an indicator on the vehicle control panel, or used to automatically admit a supply of air into the tire 14 if the computed pressure is below a normal value such as 35 psi.

Figure 4:
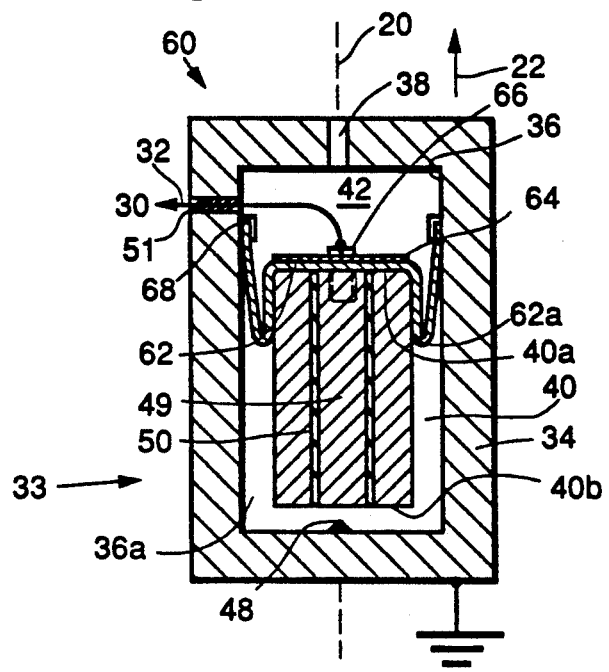
FIG. 4 illustrates an embodiment of the sensor which is similar to that of FIGS. 2 and 3, but includes a rolling diaphragm for sealing the piston.

FIG. 4 illustrates a sensor 60 embodying the present invention which is similar to the sensor 18 except that the O-rings 44 are replaced by a rolling diaphragm 62 which is commercially available, for example, from the Bellofram company of Newell, W.V.

The central portion of the diaphragm 62 is clamped to the outer face 40a of the piston 40 by an electrically insulative face plate 64 and a screw 66, whereas the periphery of the diaphragm 62 is fixed to the wall of the bore 36 by an annular clamp 68. A folded or "rolling" portion 62a of the diaphragm 62 extends into an annular space 36a between the piston 40 and the wall of the bore 36. The lead 32 is connected to the screw 66, which is threaded into and provides electrical connection to the rod 49.

The operation of the sensor 60 is essentially similar to that of the sensor 18. The advantage of the rolling diaphragm 62 over the O-rings 44 that the friction between the piston 40 and the wall of the bore 36 is substantially eliminated, and the sensor 60 is inherently more accurate than the sensor 18.

In order to eliminate variation in the operation of the sensor 60 which would result from changes in atmospheric pressure if the section 36a of the bore 36 were vented to the atmosphere, the section 36a is preferably sealed. Under ideal conditions, the pressure in the section 36a will remain constant at a known value.

The sensor 60 will operate accurately for an indefinite period of time if the diaphragm 62 is made of a material with low permeability. However, the permeability of some rolling diaphragms which are commercially available at low cost is sufficiently high that air from the chamber 42 can slowly permeate through the diaphragm 62 into the section 36a. This will cause the pressure in the section 36a to gradually increase to the pressure in the chamber 42, rendering the sensor 60 inoperative.

Figure 5:
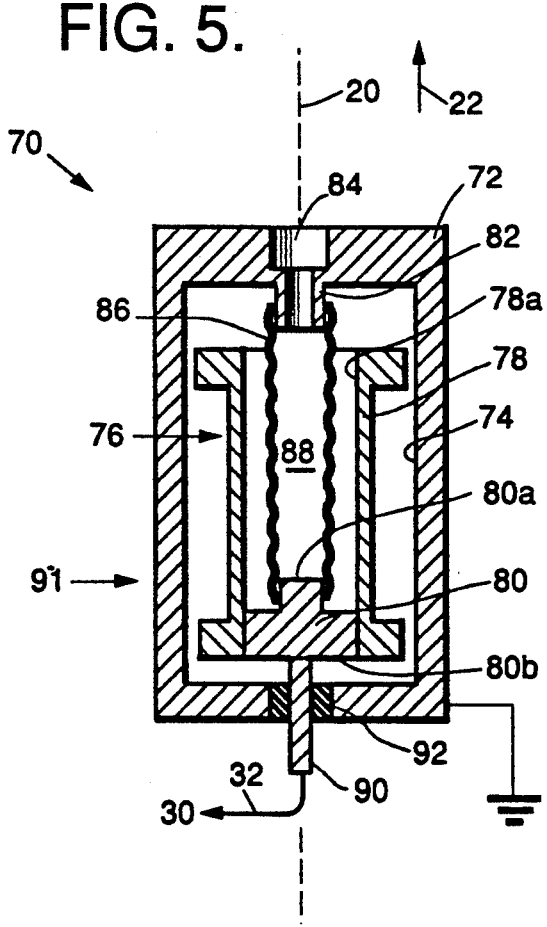
FIG. 5 illustrates an embodiment of the sensor in which the air pressure is applied to a bellows.

This problem is overcome in a sensor 70 which is illustrated in FIG. 5 and includes a body 72 formed with a bore 74. An inertial mass 76, which provides the function of the piston 40 described above, is disposed in the bore 74 for radial movement along the axis 20. The mass 76 includes an outer spool 78 which is formed with a bore 78a. A stepped plug 80 is fitted inside the radially inner end of the bore 78a. A flange 82 extends radially inwardly from the radially outer wall of the body 72, and has a passageway 84 formed therethrough which leads to the inflation space of the tire 14.

A flexible, electrically conductive metal bellows 86 extends through the bore 78a, is fixed at its opposite ends to the plug 80 and flange 82 respectively. A bellows 86 suitable for practicing the invention is commercially available from the Servomotor company of Cedar Grove, N.J. The interior of the bellows 86 defines a pressure chamber 88 which provides the function of the pressure chamber 42 described above.

More specifically, the tire pressure is transmitted through the passageway 84 into the pressure chamber 88 and exerts a corresponding force on a radially outer face 80a of the plug 80. An elongated electrical feedthrough 90 extends through an insulator 92 into the bore 74. The lead 32 is connected to the feedthrough 90. The plug 80 is electrically connected to ground through the bellows 86, flange 82 and body 72 and constitutes one contact of a switch 91 which provides the function of the switch 33 described above. The feedthrough 90 constitutes a second contact of the switch 91.

The bellows 86 is flexible, and can have negligible resilience (spring rate or constant), or a predetermined value of resilience. In either case, the air pressure in the chamber 88 acts radially inwardly on the face 80a of the plug 80, whereas centrifugal force resulting from rotation of the wheel 10 acts radially outwardly on the inertial mass 76 which includes the spool 78 and plug 80.

When the centrifugal force is smaller than the force exerted by the pressure in the chamber 88, the radially inner face 80b of the plug 80 will engage with the feedthrough 90 with the bellows 86 in the maximum extended position as illustrated, thereby closing the switch 91. When the centrifugal force overcomes the air pressure, the plug 80 moves away from the feedthrough 90, thereby opening the switch 91.

The bellows 86 is preferably made of a metal such as nickel which has extremely low permeability. Thus, substantially no air will leak from the chamber 88 into the bore 74 (external of the chamber 88), and the problem inherent in the sensor 60 which includes a low cost permeable rolling diaphragm 62 does not exist in the sensor 70.

"Run-flat" tires have been recently introduced which retain their structural integrity and handling characteristics for 100–200 miles at zero tire pressure. This enables a vehicle with a punctured run-flat tire to be driven to a service facility without having to replace the punctured tire with a spare.

The sensors 18, 60 and 70 described above provide an accurate indication of tire pressure under normal operating conditions. However, they are unable to detect a sudden loss of tire pressure at high speed, such as caused by a puncture, since the switch is open at high speed and will remain open after the loss of pressure.

Since run-flat tires retain their handling characteristics at zero tire pressure, a vehicle operator might not discover that a run-flat tire has been punctured until it has been driven for a sufficient distance to cause damage to the tire and a potentially dangerous situation.

Figure 6:
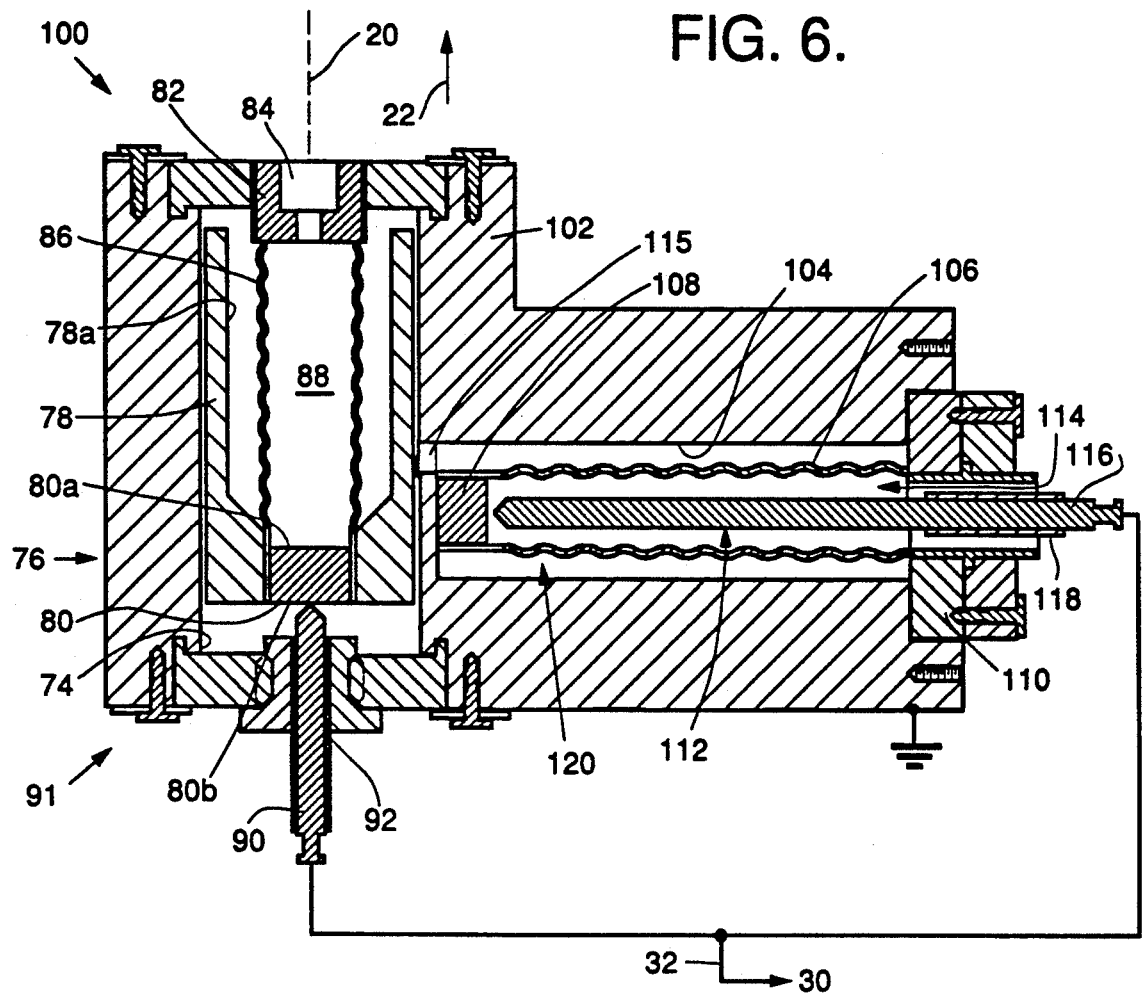
FIG. 6 illustrates an embodiment of the sensor including a second bellows for sensing when the tire air pressure is below a minimum value.

A sensor 100 illustrated in FIG. 6 is similar to the sensor 70 of FIG. 5, but can detect an under pressure condition in a run flat tire even without slowing the car enough to close switch 33 includes an additional diaphragm and switch assembly for detecting when the air pressure in the tire 14 has dropped below a predetermined minimum value such as 15 psi. The sensor 100 includes a body 102, and elements common to the sensor 70 which are designated by the same reference numerals.

A bore 104 is formed in the body 102 which extends perpendicular to the axis 20. A flexible bellows 106 extends into the bore 104. A plug 108 is fitted in the left end (as viewed in FIG. 6) of the bellows 106, whereas the right end of the bellows 106 is supported by a flange 110. The tire pressure is transmitted to a pressure chamber 112 defined inside the bellows 106 through a passageway 114 formed through the flange 110. The bores 74 and 104 are interconnected by a passageway 115.

An electrical feedthrough 116 extends through an insulator 118 which is fitted in a central hole in the flange 110. The lead 32 is connected to the external end of the feedthrough 116, whereas the internal portion of the feedthrough 116 extends through the chamber 112 such that the left end of the feedthrough 116 is adjacent to the plug 108. The plug 108 is connected to ground through the bellows 106, flange 110 and body 102 and constitutes a first contact of a low pressure sensing switch 120. The feedthrough 116 constitutes a second contact of the switch 120.

Since the bellows 106 extends perpendicular to the axis 20, it is substantially unaffected by centrifugal force resulting from rotation of the wheel 10. In the position illustrated, the pressure in the chamber 112 acts on the inner face of the plug 108, urging the bellows 106 to extend until the plug 108 abuts against the left wall of the bore 104. However, the bellows 106 is resiliently extended in the illustrated position. The resilience of the bellows 106 urges it to compress and move the plug 108 rightwardly against the force of the pressure in the chamber 112.

The resilience (spring rate or constant) of the bellows 106 is selected such that the bellows 106 will compress to move the plug 108 rightwardly to engage with the feedthrough 116 and close the switch 120 when the pressure in the chamber 112 (tire pressure) is below the predetermined minimum value. When the pressure rises above the minimum value, it overcomes the resilience of the bellows 106 and moves the plug 108 away from the feedthrough to open the switch 120.

Figure 7:
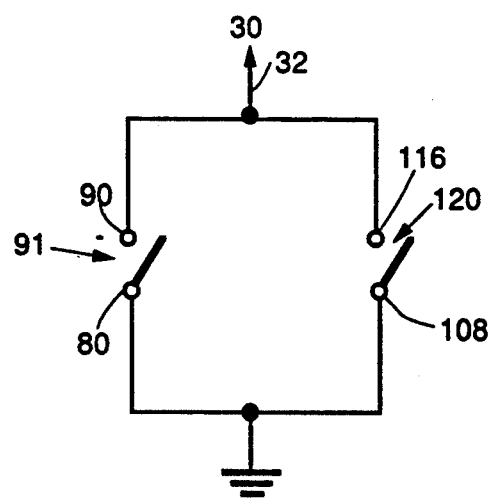
FIG. 7 is an electrical schematic diagram illustrating a switch arrangement of the sensor of FIG. 6.

A schematic diagram of the switches 91 and 120 is illustrated in FIG. 7. When the tire pressure is below the minimum value, for example 15 psi, the switch 120 will remain closed at all vehicle speeds. Since the contacts 90 and 116 are both connected to the lead 32, the lead 32 will be connected to ground at all vehicle speeds in the low pressure condition.

Thus, if the vehicle is moving at a speed V which is sufficiently high that the switch 91 should be open (normal tire pressure) but the detector unit 30 senses that the lead 32 is grounded, the tire pressure must be below the minimum value. The detector unit 30 is constructed or programmed to indicate the low pressure condition when the vehicle is moving above a predetermined speed V and the lead 32 is grounded.

The following TABLE illustrates the logical function of the switches 91 and 120 in the sensor 100, assuming that the bellows 86 is resilient and urges the plug 80 toward contact with the feedthrough 90.

TABLE

| PRESSURE AND SPEED | SWITCH 91 | SWITCH 120 | LEAD 32 |
|---|---|---|---|
| BELOW 15 PSI LOW SPEED | CLOSED | CLOSED | GROUNDED |
| BELOW 15 PSI HIGH SPEED | OPEN | CLOSED | GROUNDED |
| ABOVE 15 PSI LOW SPEED | CLOSED | OPEN | GROUNDED |
| ABOVE 15 PSI HIGH SPEED | OPEN | OPEN | OPEN |

FIGS. 8a to 8d illustrate another sensor 130 embodying the invention which provides all of the functions of the sensor 100 but includes only one bellows. The sensor 130 includes a generally cup-shaped body 132 having a chamber 134 therein with a closed upper (as viewed in the drawing) end. The lower end of the chamber 134 is closed by a flange 136. A generally cup-shaped inertial mass 138 is disposed in the chamber 134 for movement along the axis 20, and is urged toward abutment with the flange 136 by a compression spring 140.

The mass 138 has a radially inwardly facing surface 138a on which a projection 142 is formed. An annularly shaped insulator 144 extends radially outwardly from the flange 136. An annular contact 146 extends radially outwardly from the upper end of the insulator 144, and is connected through a lead 148 to a feedthrough 150 extending through an insulator 152 which fits in a hole in the body 132. The lead 32 is connected to the feedthrough 150, whereas the body 132 is grounded.

A resilient bellows 154 extends through a bore 156 formed through the flange 136 and insulator 144. The interior of the bellows 154 is exposed to the tire pressure and constitutes a pressure chamber 158. The radially outer end of the bellows 154 is sealed by an electrically conductive end plate 160 which is connected to ground through the bellows 154, flange 136 and body 132. The mass 138 is connected to the feedthrough 150 through the spring 140 and a lead 162. Further illustrated is an insulator 164 which insulates the spring 140 and lead 162 from the body 132 and thereby from ground.

The contact 146 and plate 160 constitute a low pressure switch 166 which provides the function of the switch 120 described above. The projection 142 and plate 160 constitute a switch 168 which provides the function of the switch 91 described above.

Figure 8A:
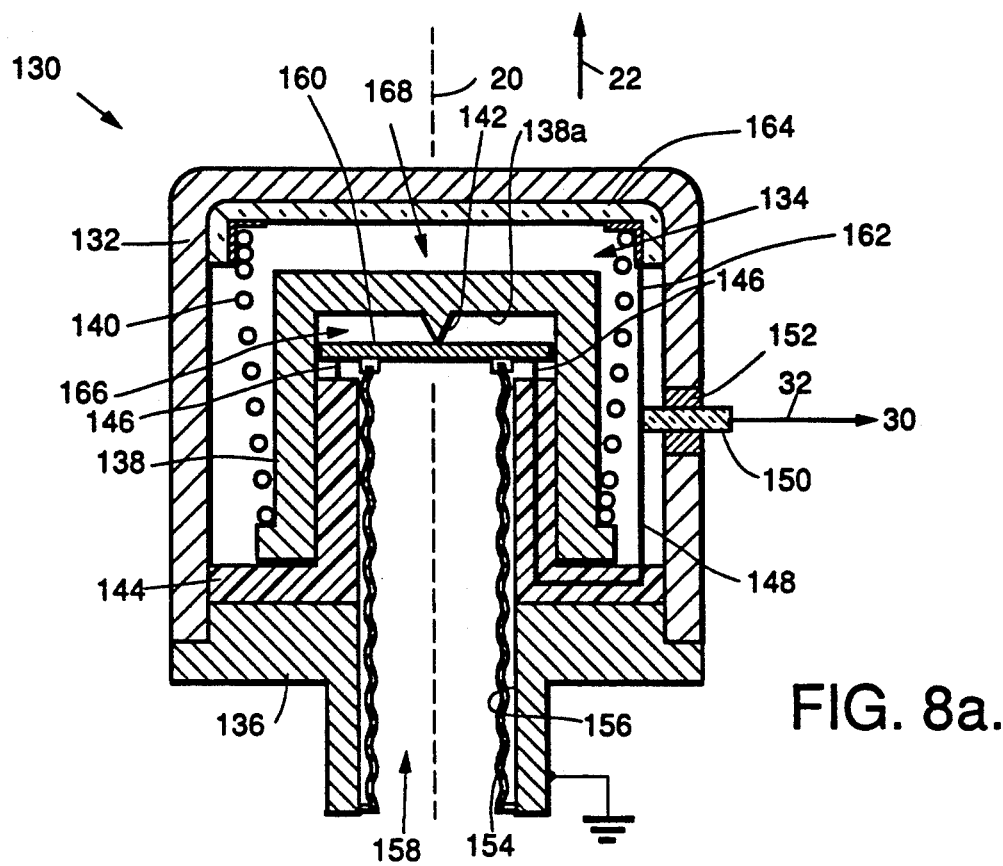
FIG. 8a illustrates an embodiment of the sensor including a single bellows for sensing the tire air pressure and for sensing when the pressure is below a minimum value, in which the pressure is below the minimum value.

FIG. 8a illustrates the condition in which the vehicle is stationary or moving at very low speed and the tire pressure is below the minimum value. The resilience of the bellows 154 is selected such that the bellows 154 will compress to move the plate 160 downwardly to engage with the contact 146 and close the switch 166.

Whereas in the sensors described above the tire pressure acts in opposition to the centrifugal force resulting from rotation of the wheel 10, in the sensor 130 the tire pressure and centrifugal force both act radially outwardly. The spring 140 exerts a radially inward force on the mass 138 in opposition to the centrifugal force. In FIG. 8a, the centrifugal force is zero or very low, and the spring 140 moves the mass 138 downwardly so that the projection 142 contacts the plate 160 and closes the switch 168.

Figure 8B:
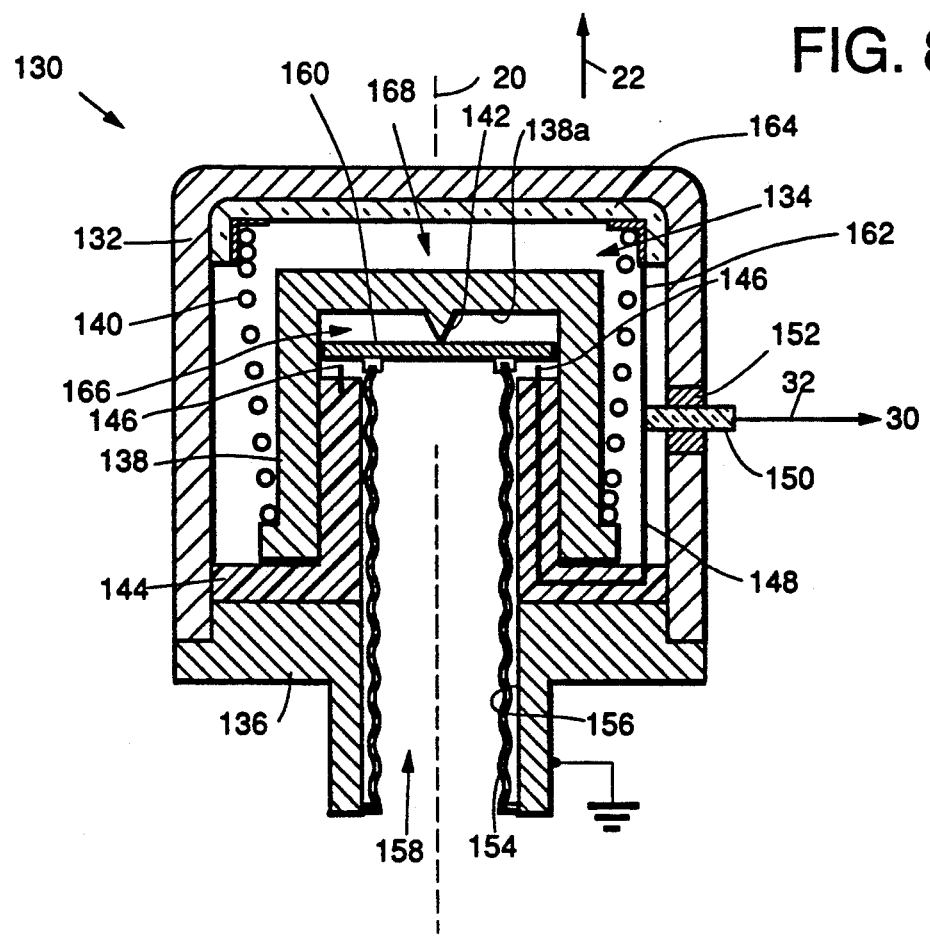
FIG. 8b is similar to FIG. 8a, but illustrates the sensor with the pressure above the minimum value and the wheel stationary or rotating at a relatively low speed.

FIG. 8b illustrates the case in which the pressure is above the minimum value, and the vehicle is stationary or moving at very low speed. The pressure in the chamber 158 overcomes the resilience of the bellows 154 and the force of the spring 140 and moves the plate 160 away from the contact 146 to open the switch 120. However, the switch 168 is still closed by the force of the spring 140.

Figure 8C:
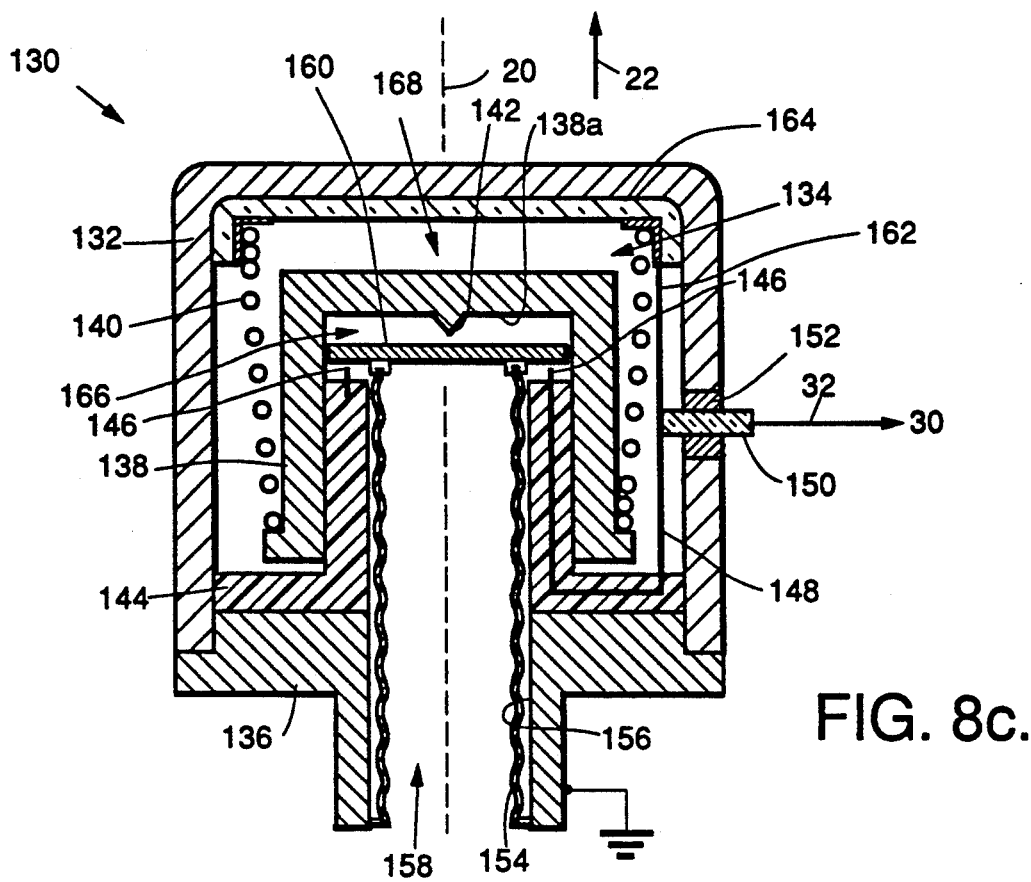
FIG. 8c is similar to FIG. 8a, but illustrates the sensor with the pressure above the minimum value and the wheel rotating at a relatively high speed.

FIG. 8c illustrates the condition in which the tire pressure is above the minimum value and the vehicle is moving sufficiently fast that the centrifugal force acting on the mass 138 moves it radially outwardly against the force of the spring 140 and the projection 142 disengages from the plate 160 to open the switch 168. In this case, the switch 166 is also open such that the lead 32 is disconnected from ground.

The resilience of the bellows 154 is selected to be much higher than that of the spring 140. Thus, the radial position of the plate 160 will vary in accordance with the pressure in the chamber 158, with negligible effect from the spring 140. The plate 160 is moved progressively radially outwardly as the tire pressure increases and progressively compresses the spring 140 as long as the centrifugal force is insufficient to overcome the force of the spring 140.

In this manner, the force exerted on the mass 138 by the spring 140 increases with tire pressure, and the centrifugal force and thereby the vehicle speed required to overcome the spring force increases with tire pressure. The switch 168 thereby opens at a speed which increases with tire pressure in a predetermined manner as described above.

Figure 8D:
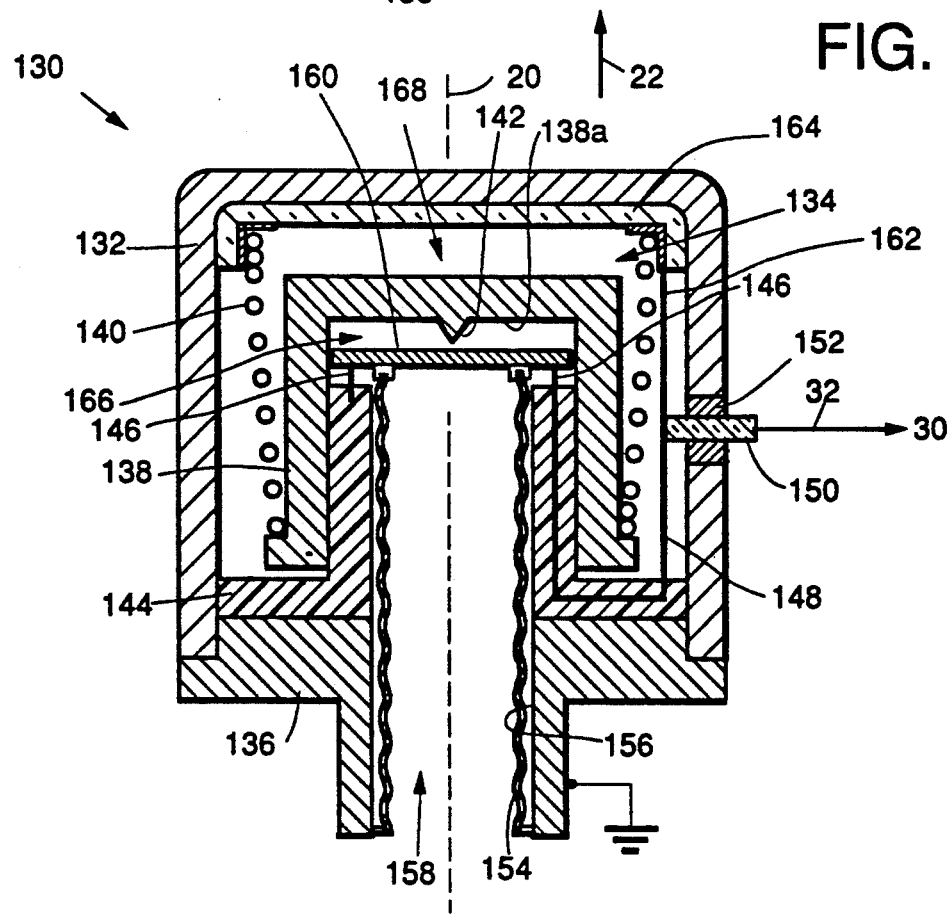
FIG. 8d is also similar to FIG. 8a, but illustrates the sensor with the pressure below the minimum value and the wheel rotating at a relatively high speed.

FIG. 8d illustrates the condition in which the vehicle is moving at a speed which is high enough to open the switch 168 but the tire pressure is below the minimum value. In this case, the switch 166 is closed, and the low pressure condition is detected by the detector unit 30 as described above with reference to the TABLE.

While several illustrative embodiments of the invention have been shown and described, numerous variations and alternate embodiments will occur to those skilled in the art, without departing from the spirit and scope of the invention.

For example, the electrical switches described above which provide the outputs of the sensors can be replaced by pneumatic or other types of switches.

Accordingly, it is intended that the present invention not be limited solely to the specifically described illustrative embodiments. Various modifications are contemplated and can be made without departing from the spirit and scope of the invention as defined by the appended claims.

We claim:

1. A sensor for sensing the pressure in a tire which is mounted on a wheel of a vehicle, said vehicle including a vehicle speed sensor, comprising:
    an inertial mass means capable of being supported by a wheel for outward movement in response to centrifugal force which results from rotation of the wheel;
    a pressure transmitting means for transmitting a tire pressure from a tire mounted on said wheel to the inertial mass means in opposition to said outward movement;
    a switch means which is actuated from a first state to a second state in response to the inertial mass means moving outward a predetermined distance in response to a centrifugal force; and
    a computing means responsive to said vehicle speed sensor and said switch for computing the tire pressure based upon the vehicle speed at which said switch changes state.

2. A sensor as in claim 1, in which the pressure transmitting means transmits said pressure to the inertial mass means radially inwardly along a radius of said wheel in opposition to said centrifugal force.

3. A sensor for sensing the pressure in a tire which is mounted on a vehicle wheel, comprising:
    an inertial mass means capable of being supported by a vehicle wheel for outward movement in response to centrifugal force which results from rotation of the wheel;
    a pressure transmitting means for transmitting a tire pressure from a tire mounted on said wheel to the inertial mass means in opposition to said outward movement; and
    a switch means which is actuated from a first state to a second state in response to the inertial mass means moving outward a predetermined distance in response to a centrifugal force; wherein
    the inertial mass means comprises a piston having a radially outer face; and
    the pressure transmitting means comprises:
    a radial bore extending along said wheel radius in which the piston is sealingly slidable;
    a pressure chamber defined in said bore adjacent the radially outer face of the piston; and
    a passageway leading from the tire to the pressure chamber.

4. A sensor for sensing the pressure in a tire which is mounted on a vehicle wheel, comprising:
    an inertial mass means capable of being supported by a vehicle wheel for outward movement in response to centrifugal force which results from rotation of the wheel;
    a pressure transmitting means for transmitting a tire pressure from a tire mounted on said wheel to the inertial mass means in opposition to said outward movement; and
    a switch means which is actuated from a first state to a second state in response to the inertial mass means moving outward a predetermined distance in response to a centrifugal force;
    wherein said pressure transmitting means transmits said pressure to the inertial mass means radially inwardly along a radius of said wheel in opposition to said centrifugal force, and said pressure transmitting means comprises a flexible bellows.

5. A sensor as in claim 4, further comprising another flexible bellows which extends perpendicular to said wheel radius for sensing when said pressure is below a predetermined minimum value and actuating the switch means to said first state in response thereto.

6. A sensor for sensing the pressure in a tire which is mounted on a vehicle wheel, comprising:
    an inertial mass means capable of being supported by a vehicle wheel for outward movement in response to centrifugal force which results from rotation of the wheel;
    a pressure transmitting means for transmitting a tire pressure from a tire mounted on said wheel to the inertial mass means in opposition to said outward movement; and
    a switch means which is actuated from a first state to a second state in response to the inertial mass means moving outward a predetermined distance in response to a centrifugal force; wherein
    the inertial mass means comprises a piston; and
    the pressure transmitting means comprises:
    a radial bore which extends along said wheel radius and has an inner surface;
    a rolling diaphragm having a radially outer periphery which is sealingly fixed to said surface;
    a pressure chamber which is sealingly defined in said bore adjacent a radially outer face of the diaphragm; and
    a passageway leading from the tire to the pressure chamber; in which
    the piston is movable in said bore and has a radially outer end which is fixed to a radially inner face of the diaphragm.

7. A sensor as in claim 1, in which the switch means comprises:
    a movable contact which is integral with a radially inwardly facing surface of the inertial mass means; and
    a fixed contact which is disposed radially inwardly of and is engageable with the movable contact.

8. A sensor as in claim 1, further comprising low pressure sensing means for sensing when said pressure is below a predetermined minimum value and actuating the switch means to said first state in response thereto.

9. A sensor for sensing the pressure in a tire which is mounted on a vehicle wheel, comprising:
    an inertial mass means capable of being supported by a vehicle wheel for outward movement in response to centrifugal force which results from rotation of the wheel;
    a pressure transmitting means for transmitting a tire pressure from a tire mounted on said wheel to the inertial mass means in opposition to said outward movement; and a switch means which is actuated from a first state to a second state in response to the inertial mass means moving outward a predetermined distance in response to a centrifugal force; and a low pressure sensing means for sensing when said pressure is below a predetermined minimum value and actuating the switch means to said first state in response thereto, said low pressure sensing means comprising a flexible bellows which extends perpendicular to said wheel radius.

10. A sensor as in claim 1, in which said pressure transmitting means transmits said pressure to the inertial mass means radially outwardly along said wheel radius.

11. A sensor as in claim 10, further comprising biasing means for urging the inertial mass means radially inwardly along said wheel radius.

12. A sensor for sensing the pressure in a tire which is mounted on a vehicle wheel, comprising:

an inertial mass means capable of being supported by a vehicle wheel for outward movement in response to centrifugal force which results from rotation of the wheel;

a pressure transmitting means for transmitting a tire pressure from a tire mounted on said wheel to the inertial mass means in opposition to said outward movement;

a switch means which is actuated from a first state to a second state in response to the inertial mass means moving outward a predetermined distance in response to a centrifugal force; and a biasing means for urging the inertial mass means radially inwardly along a radius of said wheel; wherein said pressure transmitting means transmits said pressure to the inertial mass means radially outwardly along said wheel radius; and said pressure transmitting means comprises a resilient bellows which extends along said wheel radius and has a movable radially outer end portion which is engageable with a radially inwardly facing portion of the inertial mass means.

13. A sensor as in claim 12, in which the bellows has a spring constant which is higher than the spring constant of the biasing means such that the radial position of said outer end portion of the bellows varies as a predetermined function of said pressure.

14. A sensor as in claim 13, in which the switch means comprises:

a first movable contact which is integral with said outer end portion of the bellows;

a fixed contact which is disposed radially inwardly of and is engageable with the first movable contact; and a second movable contact which is integral with said inwardly facing portion of the inertial mass means and is engageable with the first movable contact.

15. A sensor as in claim 14, in which the fixed contact and the second movable contact are in electrical contact with each other.

16. A wheel for mounting on a vehicle, said vehicle including a vehicle speed sensor, comprising:

a wheel body having a peripheral rim for mounting a tire thereon, said rim and a tire mounted thereon defining an inflation space having a variable pressure;

an inertial mass means which is integrally rotatable with the body and movable outward from the wheel by centrifugal force resulting from rotation of the wheel;

a pressure transmitting means for transmitting the pressure in said inflation space to the inertial mass means in opposition to said outward movement;

a switch means which is actuated from a first state to a second state in response to the inertial mass means moving outward a predetermined distance in response to a centrifugal force; and a computing means responsive to said vehicle speed sensor and said switch for computing the tire pressure based upon the vehicle speed at which said switch changes state.

17. A wheel as in claim 16, in which the pressure transmitting means transmits said pressure to the inertial mass means radially inwardly along a radius of said wheel in opposition to said centrifugal force.

18. A vehicle wheel, comprising:

a wheel body having a peripheral rim for mounting a tire thereon, said rim and a tire mounted thereon defining an inflation space having a variable pressure;

an inertial mass means which is integrally rotatable with the body and movable outward from the wheel by centrifugal force resulting from rotation of the wheel;

a pressure transmitting means for transmitting the pressure in said inflation space to the inertial mass means in opposition to said outward movement; and a switch means which is actuated in response to the inertial mass means moving outward a predetermined distance in response to a centrifugal force, wherein the pressure transmitting means transmits said pressure to the inertial mass means radially inwardly along a radius of said wheel in opposition to said centrifugal force;

the inertial mass means comprises a piston having a radially outer face; and the pressure transmitting means comprises:
  a radial bore extending along said wheel radium;
  a pressure chamber defined in said bore adjacent the radially outer face of the piston; and
  a passageway leading from said inflation space to the pressure chamber.

19. A vehicle wheel, comprising:

a wheel body having a peripheral rim for mounting a tire thereon, said rim and a tire mounted thereon defining an inflation space having a variable pressure;

an inertial mass means which is integrally rotatable with the body and movable outward from the wheel by centrifugal force resulting from rotation of the wheel;

a pressure transmitting means for transmitting the pressure in said inflation space to the inertial mass means in opposition to said outward movement; and a switch means which is actuated in response to the inertial mass means moving outward a predetermined distance in response to a centrifugal force, wherein the pressure transmitting means transmits said pressure to the inertial mass means radially inwardly along a radius of said wheel in opposition to said centrifugal force; and the pressure transmitting means comprises a flexible bellows.

20. A wheel as in claim 19, further comprising another flexible bellows which extends perpendicular to said wheel radius for sensing when said pressure is below a predetermined minimum value and actuating the switch means to said first state in response thereto.

21. A vehicle wheel, comprising:
a wheel body having a peripheral rim for mounting a tire thereon, said rim and a tire mounted thereon defining an inflation space having a variable pressure;
an inertial mass means which is integrally rotatable with the body and movable outward from the wheel by centrifugal force resulting from rotation of the wheel;
a pressure transmitting means for transmitting the pressure in said inflation space to the inertial mass means in opposition to said outward movement; and
a switch means which is actuated in response to the inertial mass means moving outward a predetermined distance in response to a centrifugal force, wherein
the pressure transmitting means transmits said pressure to the inertial mass means radially inwardly along a radius of said wheel in opposition to said centrifugal force;
the inertial mass means comprises a piston; and
the pressure transmitting means comprises:
a radial bore which extends along said wheel radius and has an inner surface;
a rolling diaphragm having a radially outer periphery which is sealingly fixed to said surface;
a pressure chamber which is sealingly defined in said bore adjacent a radially outer face of the diaphragm; and
a passageway leading from a tire mounted on said wheel body to the pressure chamber; in which
the piston is movable in said bore and has a radially outer end which is fixed to a radially inner face of the diaphragm.

22. A wheel as in claim 16, in which the switch means comprises:
a movable contact which is integral with a radially inwardly facing surface of the inertial mass means; and
a fixed contact which is disposed radially inwardly of and is engageable with the movable contact.

23. A wheel as in claim 16, further comprising low pressure sensing means for sensing when said pressure is below a predetermined minimum value and actuating the switch means to said first state in response thereto.

24. A vehicle wheel, comprising:
a wheel body having a peripheral rim for mounting a tire thereon, said rim and a tire mounted thereon defining an inflation space having a variable pressure;
an inertial mass means which is integrally rotatable with the body and movable outward from the wheel by centrifugal force resulting from rotation of the wheel;
a pressure transmitting means for transmitting the pressure in said inflation space to the inertial mass means in opposition to said outward movement;
a switch means which is actuated in response to the inertial mass means moving outward a predetermined distance in response to a centrifugal force; and
a low pressure sensing means for sensing when said pressure is below a predetermined minimum value and actuating the switch means to said first state in response thereto;
wherein said low pressure sensing means comprises a flexible bellows.

25. A wheel as in claim 16, in which said pressure transmitting means transmits said pressure to the inertial mass means radially outwardly along said wheel radius.

26. A wheel as in claim 25, further comprising biasing means for urging the inertial mass means radially inwardly along said wheel radius.

27. A vehicle wheel, comprising:
a wheel body having a peripheral rim for mounting a tire thereon, said rim and a tire mounted thereon defining an inflation space having a variable pressure;
an inertial mass means which is integrally rotatable with the body and movable outward from the wheel by centrifugal force resulting from rotation of the wheel;
a pressure transmitting means for transmitting the pressure in said inflation space to the inertial mass means in opposition to said outward movement;
a switch means which is actuated in response to the inertial mass means moving outward a predetermined distance in response to a centrifugal force; and
biasing means for urging the inertial mass means radially inwardly along said wheel radius; wherein
said pressure transmitting means transmits said pressure to the inertial mass means radially outwardly along said wheel radius, and comprises a resilient bellows having a movable radially outer end portion which is engageable with a radially inwardly facing portion of the inertial mass means.

28. A wheel as in claim 27, in which the bellows has a spring constant which is higher than the spring constant of the biasing means, such that the radial position of said outer end portion of the bellows varies as a predetermined function of said pressure.

29. A wheel as in claim 28, in which the switch means comprises:
a first movable contact which is integral with said outer end portion of the bellows;
a fixed contact which is disposed radially inwardly of and is engageable with the first movable contact; and
a second movable contact which is integral with said inwardly facing portion of the inertial mass means and is engageable with the first movable contact.

30. A wheel as in claim 29, in which the fixed contact and the second movable contact are in electrical contact with each other.

31. A wheel as in claim 16, further comprising a housing which is fixed to said rim inside said inflation space, the inertial mass means and pressure transmitting means being disposed in said housing.

* * * * *